US010729620B2

(12) United States Patent
Goodin (10) Patent No.: US 10,729,620 B2
(45) Date of Patent: Aug. 4, 2020

(54) BABY BOTTLE APPARATUS (71) Applicant: Oksana Monet Goodin, West Chester, OH (US)

(72) Inventor: Oksana Monet Goodin, West Chester, OH (US)

(*) Notice: Subject to any disclaimer, the term of this patent is extended or adjusted under 35 U.S.C. 154(b) by 221 days.

(21) Appl. No.: 15/909,996

(22) Filed: Mar. 1, 2018

(65) Prior Publication Data

US 2019/0269578 A1 Sep. 5, 2019

(51) Int. Cl.
*D06F 1/08* (2006.01)
*F24H 1/20* (2006.01)
*A61J 9/06* (2006.01)
*A47J 43/046* (2006.01)
*A47J 36/24* (2006.01)
*A61J 1/20* (2006.01)
*F27D 11/00* (2006.01)
*A61J 9/02* (2006.01)

(52) U.S. Cl.
CPC ............. *A61J 9/06* (2013.01); *A47J 36/2433* (2013.01); *A47J 43/046* (2013.01); *A61J 1/20* (2013.01); *A61J 9/02* (2013.01); *A61J 2200/42* (2013.01); *A61J 2200/72* (2013.01)

(58) Field of Classification Search
CPC .... A61J 9/00; A61J 9/001; A61J 9/003; A61J 9/005; A61J 9/02; A61J 9/06; A61J 9/08; A61J 1/20; A61J 2200/42; A61J 2200/44; A61J 2200/72; A61J 2200/76; A47J 43/042; A47J 43/044; A47J 43/046; A47J 43/0465; A47J 43/0711; A47J 43/0727; A47J 36/2411; A47J 36/2433; A47J 36/2438; A47J 36/2483

USPC ........ 392/444, 445, 446, 447, 451; 219/387, 219/429, 430, 432, 436, 438, 439
See application file for complete search history.

(56) References Cited

U.S. PATENT DOCUMENTS

| | | | | | |
|---|---|---|---|---|---|
| 5,797,313 | A | * | 8/1998 | Rothley | A47J 31/402 222/129.4 |
| 5,882,113 | A | * | 3/1999 | Binder | B01F 13/0016 366/146 |
| 5,970,847 | A | * | 10/1999 | Saltzman | A47J 27/004 99/287 |
| 7,878,701 | B2 | * | 2/2011 | Stephens | A47J 27/004 366/145 |
| 2005/0105387 | A1 | * | 5/2005 | Nikkhah | A47J 43/042 366/205 |
| 2011/0024537 | A1 | * | 2/2011 | Gonzalez | A47J 43/046 241/101.2 |
| 2014/0069606 | A1 | * | 3/2014 | Lee | A61J 9/001 165/63 |
| 2015/0165402 | A1 | * | 6/2015 | King | B01F 15/00409 366/145 |
| 2015/0173561 | A1 | * | 6/2015 | Foster | A47J 31/401 99/300 |
| 2016/0015209 | A1 | * | 1/2016 | Dunn | A47J 36/2438 99/483 |
| 2016/0354740 | A1 | * | 12/2016 | Gonzalez | A61J 9/0623 |

(Continued)

*Primary Examiner* — Hung D Nguyen (57) ABSTRACT

An improved baby bottle apparatus having a baby bottle adapted to be filled with a liquid and any chosen additives and then releasably attached to a base member with the base member adapted to releasably connect with the bottle member and heat a liquid to a desired temperature and stir the liquid to mix any chosen additives added to the liquid before a baby sucks on the nipple and drinks the liquid.

17 Claims, 4 Drawing Sheets

(56) References Cited

U.S. PATENT DOCUMENTS

2018/0140128 A1\* 5/2018 Kodama ............. B01F 13/0854
2019/0021548 A1\* 1/2019 Eisner ....................... A61J 9/02

\* cited by examiner

BABY BOTTLE APPARATUS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of baby bottle devices and more specifically relates to an improved baby bottle apparatus having a baby bottle adapted to be filled with a liquid and any chosen additives and then releasably attached to a base member with the base member adapted to releasably connect with the bottle member and heat a liquid to a desired temperature and stir the liquid to mix any chosen additives added to the liquid before a baby sucks on the nipple and drinks the liquid.

2. Description of the Related Art

A baby bottle is a bottle with a nipple to drink directly from. It is typically used by infants and young children, or if someone cannot (as conveniently) drink from a cup, for feeding oneself or being fed. In particular it is used to feed infant formula, expressed breast milk or pediatric electrolyte solution. When the baby is crying, the bottle needs to be ready, fast. Unfortunately, heating a bottle is not always an option and formula can form clumps or colic-causing air bubbles. Therefore, a need exists for a baby bottle that mixes and warms formula or milk with an induction heater and powered agitator inside the bottle, for fast feedings without colic-causing air bubbles or clumps ready to comfort a baby no matter where you are.

Various attempts have been made to solve problems found in baby formula preparation devices art. Among these are found in: U.S. Pat. No. 8,960,992 to Jong et al. U.S. Pat. No. 8,360,279 to Matthew L. Giles; U.S. Pub. No. 2006/0007781 to Martin et al.; U.S. Pub. No. 2005/0238341 to Thaler et al.; and U.S. Pat. No. 8,851,739 to Osmay Gonzalez. This prior art is representative of baby formula heating and mixing devices.

Ideally, an improved baby bottle apparatus should be user-friendly and safe in-use and, yet should operate reliably and be manufactured at a modest expense. Thus, a need exists for an improved baby bottle apparatus having a baby bottle adapted to be filled with a liquid and any chosen additives and then releasably attached to a base member with the base member adapted to releasably connect with the bottle member and heat a liquid to a desired temperature and stir the liquid to mix any chosen additives added to the liquid before a baby sucks on the nipple and drinks the liquid and to avoid the above-mentioned problems.

BRIEF SUMMARY OF THE INVENTION

In view of the foregoing disadvantages inherent in the known baby bottle art, the present invention provides an improved baby bottle apparatus. The general purpose of the present invention, which will be described subsequently in greater detail is to provide an improved baby bottle apparatus having a baby bottle adapted to be filled with a liquid and any chosen additives and then releasably attached to a base member with the base member adapted to releasably connect with the bottle member and heat a liquid to a desired temperature and stir the liquid to mix any chosen additives added to the liquid before a baby sucks on the nipple and drinks the liquid.

An improved baby bottle apparatus comprises a base member and a bottle member. The base member includes: a top wall having a top surface; a bottom wall; at least one side wall; at least one connector member; a power supply; a power control member; a heating control member; a temperature display member; a mixing control member; a mixing motor; and a mixing axle. The at least one side wall is connected between the top wall and the bottom wall. The top wall, the at least one side wall, and the bottom wall form an interior volume. The at least one connector member is located upon the top surface of the top wall and is adapted to releasably connect with a bottom portion of a bottle member.

The power supply is located within the interior volume. The power control member is located upon one of the at least one side wall and is adapted to control power from the power supply. The heating control member is located upon one of the at least one side wall and is adapted to control power from the power control member and to a heating element of the bottle member. The temperature display member is located upon one of the at least one side wall, is electrically connected to the power control member, and is adapted to receive temperature information from a temperature sensor of said bottle member and display the temperature of the bottle member thereupon.

The mixing control member is located upon one of the at least one side wall and is adapted to control power from the power control member and to a mixing motor. The mixing motor is located within the interior volume, is electrically connected to the mixing control member, and is adapted to spin a mixing axle. The mixing axle is mechanically connected to the mixing motor, is adapted to rotate, and extends through and outwards from the top surface of the top wall and is adapted to releasably connect to and rotate an agitator module of the bottle member.

The bottle member includes a bottom portion; at least one side wall; a top portion; a heating element; a temperature sensor; and an agitator module. The bottom portion includes a bottom panel and at least one connector portion. The at least one connector member is connected to the bottom panel and is adapted to releasably connect with the at least one connector member of the base member. The at least one side wall is connected to and extends from the bottom panel.

The top portion including: a bottom rim, a main wall, a nipple member. The bottom rim is adapted to releasably connect with a top rim of the at least one side wall. The main wall is connected to the bottom rim and extends therefrom. The nipple member is connected to a top portion of the main wall and is shaped and adapted to be sucked on by a baby. The top portion is adapted to be removably coupled to the at least one side wall. The bottom portion, the at least one side wall, and the top portion form an interior volume.

The heating element is connected to the bottom panel, is adapted to receive electric power from the heating control member of the base member, and is adapted to heat liquid placed within the interior volume of the bottle member.

The temperature sensor is attached to an interior surface of the main wall, is adapted to be electrically connected to the temperature display member of the base member, and is adapted to send temperature information of the liquid placed within the interior volume of the bottle member to the temperature display member of said base member.

The agitator module is located within said interior volume of said bottle member in proximity to said bottom panel of said bottom portion, extends upwardly therefrom, is releasably connected to said mixing axle of said mixing motor, and adapted to rotate and mix liquid placed within the interior volume of said bottle member.

The bottle member is adapted to be filled with a liquid and any chosen additives and then releasably attached to said base member; and wherein the base member is adapted to releasably connect with said bottle member and heat said liquid to a desired temperature and stir said liquid to mix any chosen additives added to said liquid before a baby sucks on said nipple and drinks said liquid.

The present invention holds significant improvements and serves as an improved baby bottle apparatus. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, an Improved Baby Bottle Apparatus constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a baby bottle device and more specifically relates to an improved baby bottle apparatus having a baby bottle adapted to be filled with a liquid and any chosen additives and then releasably attached to a base member with the base member adapted to releasably connect with the bottle member and heat a liquid to a desired temperature and stir the liquid to mix any chosen additives added to the liquid before a baby sucks on the nipple and drinks the liquid Generally speaking, the improved baby bottle apparatus quickly mixes and warms formula or milk with an induction heater and powered agitator inside the bottle, for fast feedings without colic-causing air bubbles or clumps. Plus, the compact size and rechargeable battery means the Better Bottle is ready to comfort your baby no matter where you are.

No Other Bottle Offers the all-in-One, Compact Convenience of the Better Bottle's Unique Features:
  Portable heater and mixer inside the bottle for feedings anywhere
  Detects temperature, with LED display to indicate when the contents are ready
  Magnetic induction heating system is faster and safer
  Battery operated with USB charging plug
  Compatible with breast milk and formula
Heats Milk More Efficiently and Also Makes Better Formula:
1. No clumps
2. No air bubbles
3. Fast preparation—just one minute
4. Have warm milk ready on-the-go
5. Great for nursing or formula-using moms Referring now to FIGS. 1-8, showing perspective views illustrating improved baby bottle apparatus 100 according to an embodiment of the present invention of FIG. 1.

Improved baby bottle apparatus 100 comprises base member 110 and bottle member 400. Base member 110 includes: top wall 200 having top surface 206; bottom wall 210; at least one side wall 220; at least one connector member 230; power supply 240; power control member 250; heating control member 260; temperature display member 270; mixing control member 280; mixing motor 286; and mixing axle 292. At least one side wall 220 is connected between top wall 200 and bottom wall 210. Top wall 200, at least one side wall 220, and bottom wall 210 form interior volume 216. At least one connector member 230 is located upon top surface 206 of top wall 200 and is adapted to releasably connect with bottom portion 410 of bottle member 400.

Power supply 240 is located within interior volume 216. Power control member 250 is located upon one of at least one side wall 220 and is adapted to control power from power supply 240. Heating control member 260 is located upon one of at least one side wall 220 and is adapted to control power from power control member 250 and to heating element 500 of bottle member 400. Power supply 240 is formed as battery members 242. Wherein battery members 242 are rechargeable.

Figure 1:
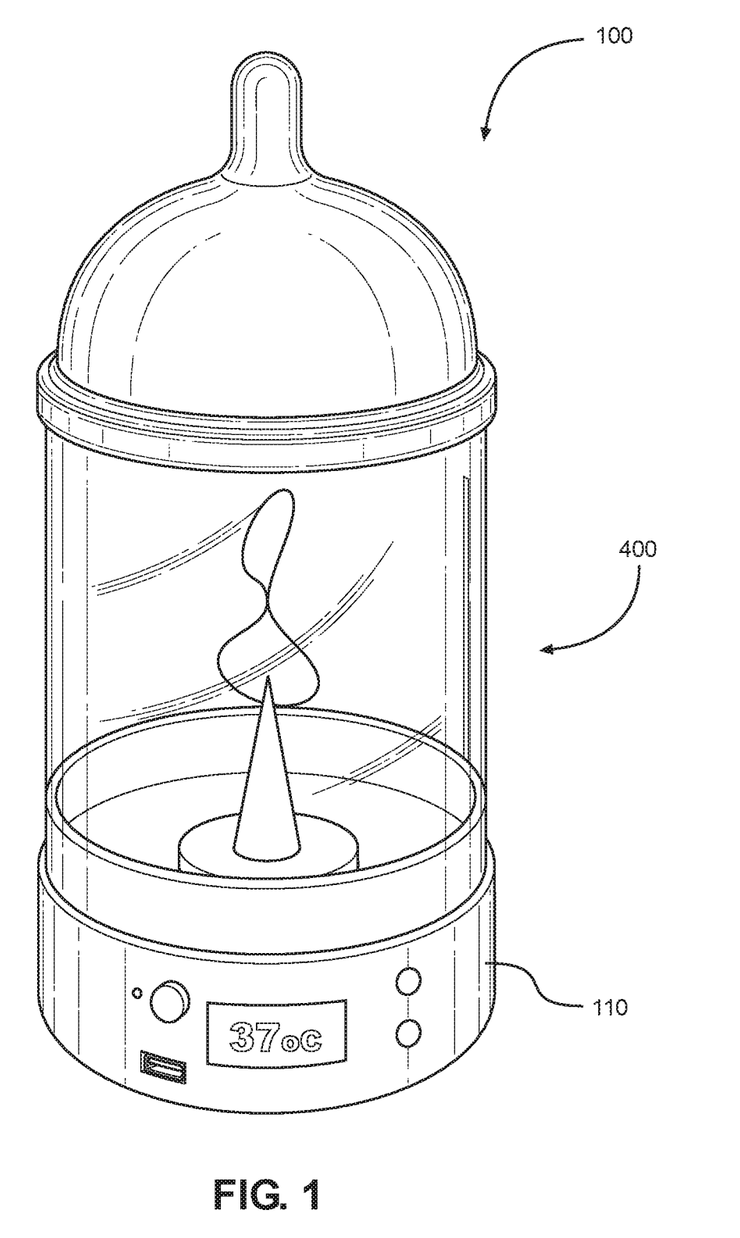
FIG. 1 shows a perspective view illustrating an Improved Baby Bottle Apparatus according to an embodiment of the present invention.
Figure 2:
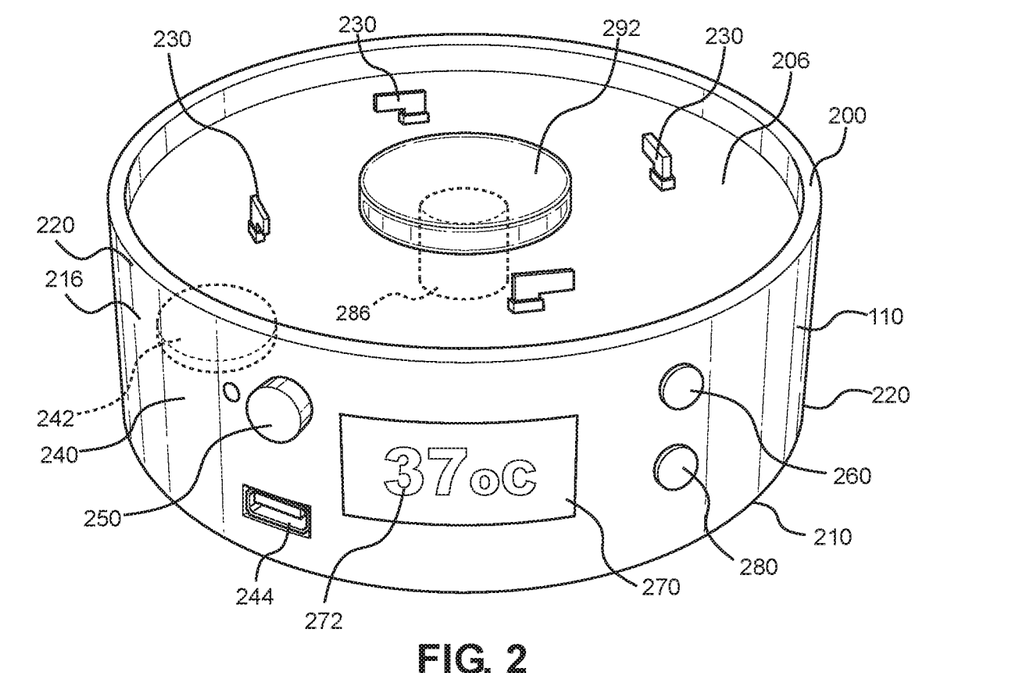
FIG. 2 shows a perspective view illustrating a base member of the Improved Baby Bottle Apparatus according to an embodiment of the present invention.
Figure 3:
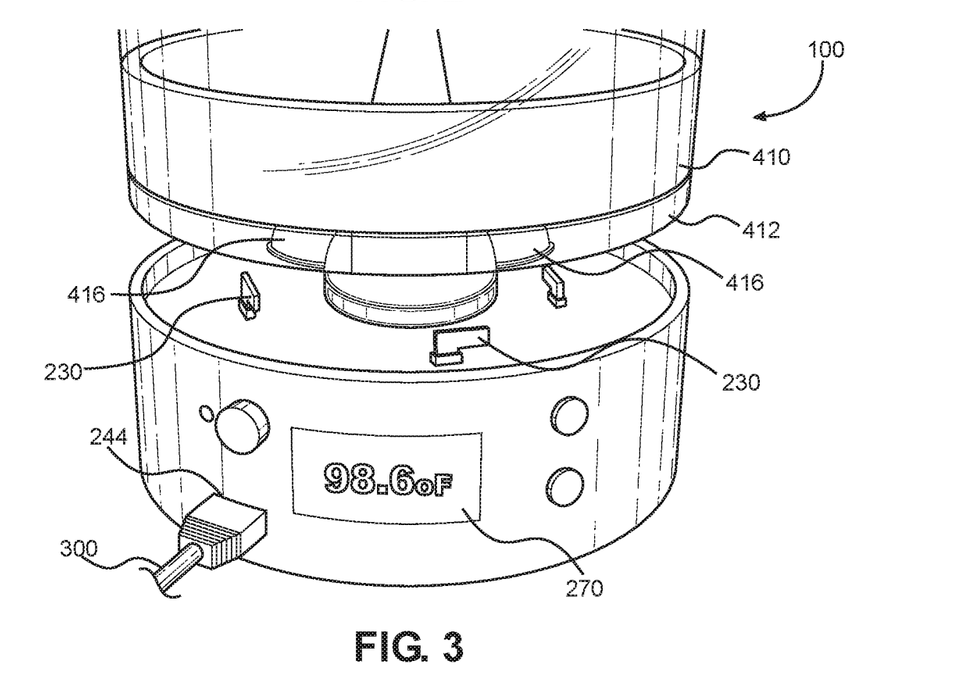
FIG. 3 is a exploded view illustrating of the base member and bottle member of the Improved Baby Bottle Apparatus according to an embodiment of the present invention.
Figure 4:
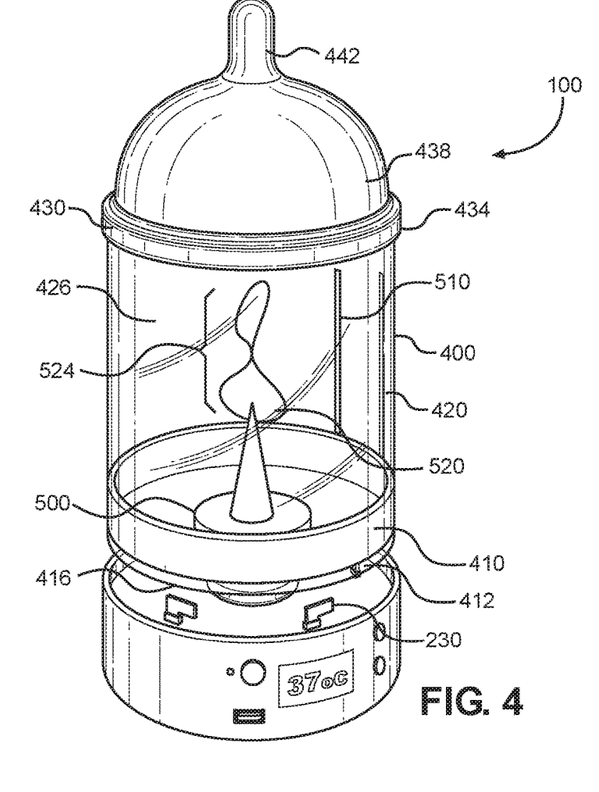
FIG. 4 is a front side perspective view illustrating another view of the Improved Baby Bottle Apparatus according to an embodiment of the present invention of FIG. 1.

Improved baby bottle apparatus 100 further comprising USB port 244 is located upon one of at least one side wall 220 and is adapted to receive power from USB cable 300 and send power to power supply 240 as shown in FIG. 3. Improved baby bottle apparatus 100 further comprising USB cable 300 adapted to releasably connect with USB port 244 and is adapted to receive power from an external power source and send power to power supply 240 via said USB port 244.

Temperature display member 270 is located upon one of at least one side wall 220, is electrically connected to power control member 250, and is adapted to receive temperature information from temperature sensor 510 of bottle member 400 and display temperature of bottle member 400 thereupon. Wherein temperature display member 270 includes light emitting diode display 272.

Mixing control member 280 is located upon one of at least one side wall 220 and is adapted to control power from power control member 250 and to mixing motor 286. Mixing motor 286 is located within interior volume 216, is electrically connected to mixing control member 280, and is adapted to spin mixing axle 292. Mixing axle 292 is mechanically connected to mixing motor 286, is adapted to rotate, and extends through and outwards from top surface 206 of top wall 200 and is adapted to releasably connect to and rotate agitator module 520 of bottle member 400.

Bottle member 400 includes bottom portion 410; at least one side wall 420; top portion 430; heating element 500; temperature sensor 510; and agitator module 520. Bottom portion 410 includes bottom panel 412 and at least one connector portion 416. At least one connector portion 416 is connected to bottom panel 412 and is adapted to releasably connect with at least one connector member 230 of base member 110. At least one side wall 420 is connected to and extends from bottom panel 412.

Top portion 430 includes bottom rim 434, main wall 438, and nipple member 442. Bottom rim 434 is adapted to releasably connect with top rim 424 of at least one side wall 420. Main wall 438 is connected to bottom rim 434 and extends therefrom. Nipple member 442 is connected to top portion 430 of main wall 438 and is shaped and adapted to be sucked on by baby 610 as shown in in-use condition 600 of FIG. 6. Top portion 430 is adapted to be removably coupled to the at least one side wall 420. Bottom portion 410, said at least one side wall 420, and top portion 430 form interior volume 426.

Wherein at least one side wall 420 of bottle member 400 is formed from a material chosen from a group of materials consisting of acrylic, plastic, and glass. wherein material of said side wall 420 is translucent. Wherein main wall 438 and nipple member 442 of bottle member 400 is formed from a material chosen from a group of materials consisting of plastic, rubber, and silicone.

Figure 5:
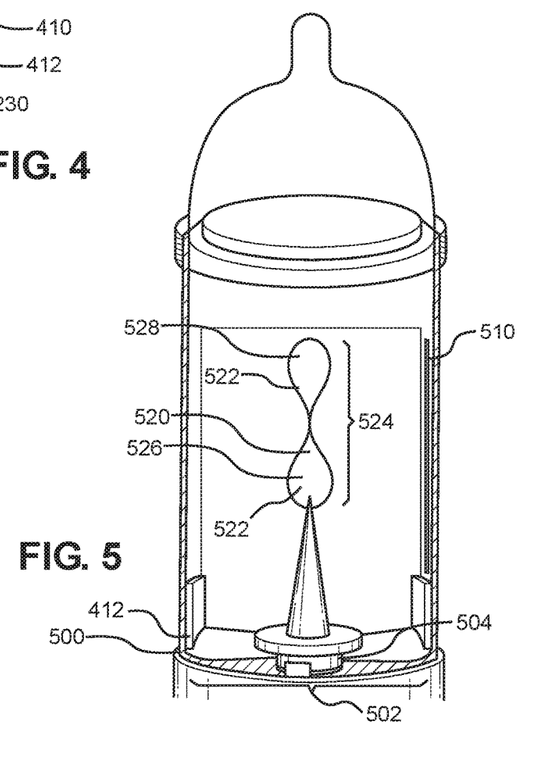
FIG. 5 is a perspective view illustrating a heating element and temperature sensor on the bottle member of the Improved Baby Bottle Apparatus according to an embodiment of the present invention of FIG. 1.
Figure 6:
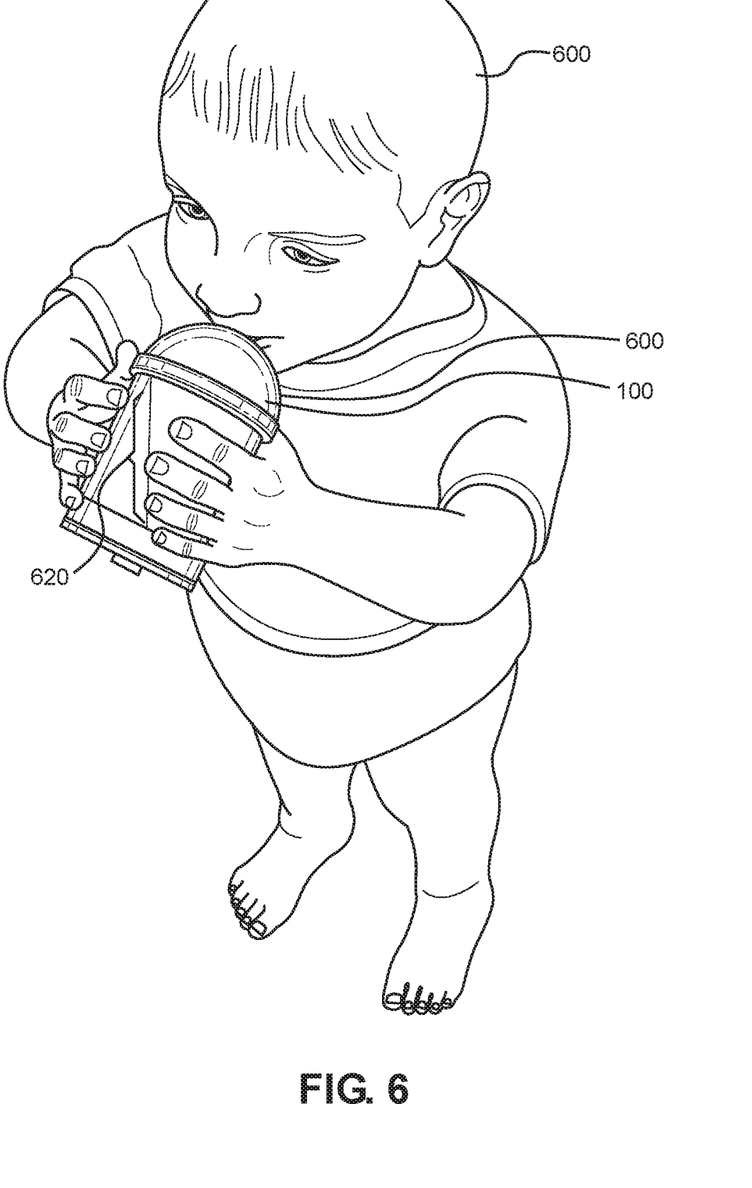
FIG. 6 is a perspective view illustrating the Improved Baby Bottle Apparatus in an in-use condition according to an embodiment of the present invention of FIG. 1.

Heating element 500 is connected to bottom panel 412, is adapted to receive electric power from heating control member 260 of base member 110, and is adapted to heat liquid placed within interior volume 426 of bottle member 400. Temperature sensor 510 is attached to an interior surface of main wall 438, is adapted to be electrically connected to temperature display member 270 of base member 110, and is adapted to send temperature information of liquid 620 placed within interior volume 426 of bottle member 400 to temperature display member 270 of base member 110. Wherein heating element 500 is formed as magnetic induction heating element. The magnetic induction heating element includes at least one magnetic panel member 502. Wherein magnetic induction heating element includes at least two magnetic panel members 504.

Wherein heating control member 260, heating element 500, and temperature display member 270 are adapted to heat and maintain liquid 620 at 98.6 degrees Fahrenheit and display 98.6 on temperature display member 270, such that liquid 620 is substantially the same temperature as human breast milk directly taken out of a human body and is ready for consumption by baby 610 as shown in in-use condition 600 of FIG. 6.

Agitator module 520 is located within interior volume 426 of bottle member 400 in proximity to bottom panel 412 of bottom portion 410, extends upwardly therefrom, is releasably connected to mixing axle 292 of mixing motor 286, and adapted to rotate and mix liquid 610 placed within interior volume 426 of bottle member 400. Wherein agitator module 520 is formed having at least one panel member 522 adapted to extend vertically and spin within interior volume 426 of bottle member 400. Wherein agitator module 520 is formed having two panel members 524 adapted to extend vertically one on top of the other and spin within interior volume 426 of bottle member 400. Wherein two panel members 524 are offset ninety degrees from one another. Wherein one of two panel members 522 is formed in the shape of tear-drop 526; and the second of two panel members 524 is formed in the shape of inverted tear-drop 528.

Bottle member 400 is adapted to be filled with liquid 610 and any chosen additives and then releasably attached to base member 110; and wherein base member 110 is adapted to releasably connect with bottle member 400 and heat liquid 620 to a desired temperature and stir liquid 620 to mix any chosen additives added to liquid 620 before baby 610 sucks on said nipple 442 and drinks liquid 610.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is:

1. An improved baby bottle apparatus comprising:
   a base member including:
      a top wall including:
         a top surface;
      a bottom wall;
      at least one side wall;
         wherein said at least one side wall is connected between said top wall and said bottom wall;
      wherein said top wall, said at least one side wall, and said bottom wall form an interior volume;
      at least one connector member;
         wherein said at least one connector member is located upon said top surface of said top wall and is adapted to releasably connect with a bottom portion of a bottle member;
      a power supply;
         wherein said power supply is located within said interior volume;
      a power control member;

wherein said power control member is located upon one of said at least one side wall and is adapted to control power from said power supply;
a heating control member;
wherein said heating control member is located upon one of said at least one side wall and is adapted to control power from said power control member and to a heating element of said bottle member;
a temperature display member;
wherein said temperature display member is located upon one of said at least one side wall, is electrically connected to said power control member, and is adapted to receive temperature information from a temperature sensor of said bottle member and display the temperature of said bottle member thereupon;
a mixing control member;
wherein said mixing control member is located upon one of said at least one side wall and is adapted to control power from said power control member and to a mixing motor;
wherein said mixing motor is located within said interior volume, is electrically connected to said mixing control member, and is adapted to spin a mixing axle; and
wherein said mixing axle is mechanically connected to said mixing motor, is adapted to rotate, and extends through and outwards from said top surface of said top wall and is adapted to releasably connect to and rotate an agitator module of said bottle member; and
the bottle member comprising:
the bottle portion including:
a bottom panel;
at least one connector portion;
wherein said at least one connector portion is connected to said bottom panel and is adapted to releasably connect with said at least one connector member of said base member;
at least one side wall;
wherein said at least one side wall is connected to and extends from said bottom panel;
a top portion including:
a bottom rim;
wherein said bottom rim is adapted to releasably connect with a top rim of said at least one side wall;
a main wall;
wherein said main wall is connected to said bottom rim and extends therefrom; and
a nipple member;
wherein said nipple member is connected to a top portion of said main wall and is shaped and adapted to be sucked on by a baby;
wherein said top portion is adapted to be removably coupled to said at least one side wall;
wherein said bottom portion, said at least one side wall, and said top portion form an interior volume;
the heating element;
wherein said heating element is connected to said bottom panel, is adapted to receive electric power from said heating control member of said base member, and is adapted to heat liquid placed within said interior volume of said bottle member;
the temperature sensor;
wherein said temperature sensor is attached to an interior surface of said main wall, is adapted to be electrically connected to said temperature display member of said base member, and is adapted to send temperature information of said liquid placed within said interior volume of said bottle member to said temperature display member of said base member; and
the agitator module;
wherein said agitator module is located within said interior volume of said bottle member in proximity to said bottom panel of said bottom portion, extends upwardly therefrom, is releasably connected to said mixing axle of said mixing motor, and adapted to rotate and mix liquid placed within said interior volume of said bottle member;
wherein said bottle member is adapted to be filled with a liquid and any chosen additives and then releasably attached to said base member; and
wherein said base member is adapted to releasably connect with said bottle member and heat said liquid to a desired temperature and stir said liquid to mix any chosen additives added to said liquid before the baby sucks on said nipple and drinks said liquid.

2. The improved baby bottle apparatus of claim 1, wherein said power supply is formed as battery members.

3. The improved baby bottle apparatus of claim 2, wherein said battery members are rechargeable.

4. The improved baby bottle apparatus of claim 1, further comprising a USB port is located upon one of said at least one side wall and is adapted to receive power from a USB cable and send power to said power supply.

5. The improved baby bottle apparatus of claim 4, further comprising a USB cable adapted to releasably connect with said USB port and is adapted to receive power from an external power source and send power to said power supply via said USB port.

6. The improved baby bottle apparatus of claim 1, wherein said temperature display member includes a light emitting diode display.

7. The improved baby bottle apparatus of claim 1, wherein said heating element is formed as a magnetic induction heating element.

8. The improved baby bottle apparatus of claim 7, wherein said magnetic induction heating element includes at least one magnetic panel member.

9. The improved baby bottle apparatus of claim 8, wherein said magnetic induction heating element includes at least two magnetic panel members.

10. The improved baby bottle apparatus of claim 1, wherein said agitator module is formed having at least one panel member adapted to extend vertically and spin within said interior volume of said bottle member.

11. The improved baby bottle apparatus of claim 10, wherein said agitator module is formed having two panel members adapted to extend vertically one on top of the other and spin within said interior volume of said bottle member.

12. The improved baby bottle apparatus of claim 11, wherein said two panel members are offset ninety degrees from one another.

13. The improved baby bottle apparatus of claim 12, wherein one of said two panel members is formed in the shape of a tear-drop; and the second of said two panel members is formed in the shape of an inverted tear-drop.

14. The improved baby bottle apparatus of claim 1, wherein said heating control member, said heating element, and said temperature display member are adapted to heat and maintain said liquid at 98.6 degrees Fahrenheit and display 98.6 on said temperature display member, such that said liquid is substantially the same temperature as human breast milk directly taken out of a human body and is ready for consumption by a baby.

15. The improved baby bottle apparatus of claim 1, wherein said at least one side wall of said bottle member is formed from a material chosen from a group of materials consisting of acrylic, plastic, and glass.

16. The improved baby bottle apparatus of claim 1, wherein said material of said side wall is translucent.

17. The improved baby bottle apparatus of claim 1, wherein said main wall and said nipple member of said bottle member is formed from a material chosen from a group of materials consisting of plastic, rubber, and silicone.

\* \* \* \* \*